US005433519A

United States Patent [19]

Irsch

[11] Patent Number: 5,433,519

[45] Date of Patent: Jul. 18, 1995

[54] METHOD AND APPARATUS FOR THE APPLICATION OF MORTAR OR CONCRETE BY SPRAYING

[75] Inventor: Hans-Peter Irsch, Völklingen, Germany

[73] Assignee: PFT Putz und Fördertechnik GmbH, Iphofen, Germany

[21] Appl. No.: 186,810

[22] Filed: Jan. 25, 1994

[30] Foreign Application Priority Data

Aug. 26, 1993 [EP] European Pat. Off. ........... 93113616

[51] Int. Cl.[6] .......................... B65G 53/46; B28C 5/02

[52] U.S. Cl. .......................................... 366/3; 222/152; 222/636; 239/654; 366/10; 366/14; 366/38; 366/157.1

[58] Field of Search ...................... 366/1, 2, 3, 5, 6, 8, 366/10, 11, 14, 15, 16, 27, 40, 101, 102, 103, 106, 107, 150, 157, 156, 38; 222/138, 142, 636; 239/654

[56] References Cited

U.S. PATENT DOCUMENTS

| | | | |
|---|---|---|---|
| 1,663,206 | 3/1928 | MacRae . | |
| 2,392,408 | 1/1946 | Radonich | 366/3 |
| 3,026,094 | 3/1962 | True | 366/5 |
| 3,672,646 | 6/1972 | Burtin . | |
| 3,767,170 | 10/1973 | Morgenstern | 366/3 |
| 5,094,403 | 3/1992 | Tschumi | 239/654 |

FOREIGN PATENT DOCUMENTS

| | | |
|---|---|---|
| 360737 | 1/1981 | Austria . |
| 1111953 | 5/1968 | United Kingdom . |

*Primary Examiner*—Robert W. Jenkins
*Attorney, Agent, or Firm*—Darby & Darby

[57] ABSTRACT

A method and device for the application of mortar or concrete by spraying, wherein a quick-acting binding agent mixed with an admixture is transferred to a spraying-nozzle by a pneumatic conveyor where water is added, wherein the binding agent is added mixed with the admixture during the pneumatic transfer.

13 Claims, 2 Drawing Sheets

METHOD AND APPARATUS FOR THE APPLICATION OF MORTAR OR CONCRETE BY SPRAYING

BACKGROUND OF THE INVENTION

1. Field of the Invention

The invention relates to a method for the application of mortar or concrete by spraying, wherein a quick-acting binding agent, particularly a "short" cement mixed with an admixture is transferred to a spraying-nozzle by means of a pneumatic conveyor when water is added. The invention also relates to a device to carry out this method. The pneumatic conveyor transfers and simultaneously mixes the binding agent and the admixture.

2. Description of Related Art

The known method is primarily used for the restoration of concrete, such as in tunnels, bridges etc. Most of the time when compared with plaster and other finishing mortars the concrete must be applied in a somewhat thicker layer, which due to its heavy additives tends to drop before completely setting up. To avoid this, a quick-binding cement with additives which increases the viscosity of the not-set concrete is used. The commonly used addition of water-glass for the increase of viscosity could cause damage to the concrete later. In order to avoid this, extremely quick-binding cements which require a processing time of only a few seconds were used recently. In order for the cements not to bind during the mixing with the moisture of the admixture, dried sand and gravel are used, however at relatively high cost for the drying.

The purpose of this invention is to reduce the costs for the application of mortar or concrete with quick-acting binding agents by using a pneumatic conveyor to simultaneously mix and transfer the mortar or concrete prior the application.

SUMMARY OF TEE INVENTION

According to the invention, this purpose is fulfilled, starting with the method mentioned earlier of adding the binding agent during the pneumatic transfer with the admixtures.

The desired purpose according to the invention, is for the material in the pneumatic transfer stream with its strong mixing effects (in certain cases it is the length of the transfer stream) to replace the mixing process in the mixer. The admixture need not be dried under these circumstances. The time for the exposure of the binding agent to the moisture of the admixture amounts to just seconds. No lumping or other troubling effects in the spray nozzle occur at the transfer and the mixing with the water.

The device according to the invention uses a pneumatic transfer device in common with known devices. These devices serve for the transfer of the binding agents and the admixture of a solid matter mix of a mortar or concrete to a spray-nozzle for adding water. The difference in the design for the addition of the binding agent with the pneumatic transfer device is the use of two successively connected loading stations for binding agents and admixtures.

It is preferred to load the pneumatic conveyor stream at first with the binding agent and then with the admixture, which means the loading station for the binding agent is ahead of the feeding station for the admixture. In this way the mixing is more effective than if the sequence is reversed. At first only the binding agent will be put into the mixture because it is the smaller and more finely grained portion of the entire atmosphere of the conveyor stream. This provides for relatively low concentrated solid material in air suspension, which behaves in the loading station for the admixture not much differently than pure air. The finely grained binding agent which is distributed in the air together with the atmosphere penetrates the admixture. The same way as the finished pneumatic conveyor stream of the solid material components of the mortar or concrete forms, the mixture of their components form. This provides a high degree of homogeneity.

As an advantageous design feature of the known invention, it is proposed for the binding agent and/or the admixture in U.S. Pat. No. 2,314,031 to provide a loading station, which has a hopper which will be filled with the appropriate material. Below there is also a rotor which rotates in a vertical axis, and is designed to have a wreath of vertical chambers similar to a cartridge cylinder. These chambers are open on the top and closed on the bottom on a portion of their rotational path, and on a different portion both the top and the bottom chambers are open and are arranged between an inlet and an outlet of the pneumatic conveyor stream. With these loading stations the separate tasks occur without difficulties and provide for particularly good mixing, Finally it is proposed to provide rotors in both loading stations for the binding agent, which will be essentially equal in the horizontal cross-sections and are not as high as the chambers in the loading station for the admixture. Due to the lower height one can fully adjust the chamber volume in relation to the mixing proportion and in so doing produce essentially equal flow cross-sections. This proves to be advantageous for the operation of the entire device.

In at least one area, for the addition of the binding agent just before the pneumatic conveying, the device of the invention is different from the state of the art in that a pneumatic loading station is provided which features a hopper for filling the admixture and below it, is a rotor which rotates around a vertical axis and also has a rim of vertical chambers.

These chambers are on a section of their rotational path open on the top and closed on the bottom and at a different section open both on the top and on the bottom and located between an inlet and an outlet of the pneumatic conveyor stream. The hopper has a mechanical conveyor for the binding agent which ends near the bottom of the hopper, preferably in the center. As can be seen this design compared to the first and simpler design provides a more rapid speed for the mixing and further transfer of the combined materials and therefore avoids the build up of lumps and other disturbances.

In order to transfer the materials in the best possible continuous composition to the loading station, an impeller is provided below the outlet of the hopper and passes over its bottom. Preferably it is driven by the same shaft or a shaft coaxial to the one of the rotor. For practical reasons the conveyor consists of a worm-conveyor which is located in a cover pipe and is laterally inserted through a wall of the hopper. The worm-conveyor would preferably also be used as a proportioning device with an adjustable drive and has a continuously variable motor. In this design the worm-conveyor could lead from a storage container to the hopper, if located next to it. The preferred shape for the storage container would be like a trough with a worm and/or a bucket shaft above its bottom and continues as the previously mentioned worm-conveyor.

The drawings show two examples of the present invention.

DETAILED DESCRIPTION OF TEE INVENTION

Figure 1:
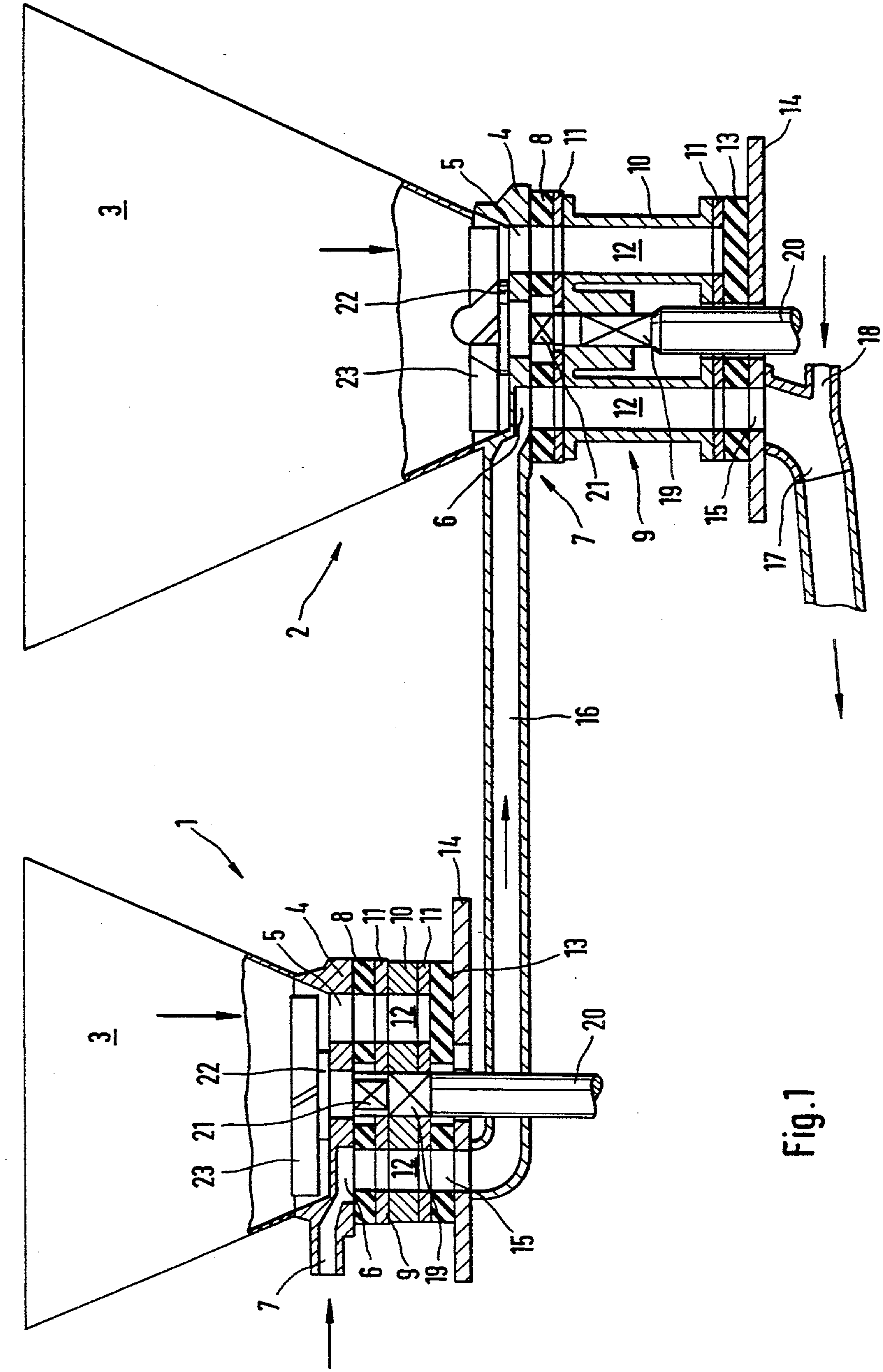
FIG. 1 shows a vertical, axial cross-section through a device for the creation of a pneumatic conveyor stream and at the same time of a mixture of solid materials for mortar or concrete and for the production of this mixture of solid materials.

The device consists according to FIG. 1 essentially of two loading stations 1 and 2, and a pneumatic conveyor device. The loading stations 1 and 2 have similar designs except for differing sizes. A binding agent, or "short" concrete, is dispensed from loading station 1 while an admixture is dispensed from loading station 2.

A hopper 3 has a bottom 4, which on the right half of the drawing has a circular-shaped row of closely adjacent passages 5 with circular cross-sections. The left half of the bottom 4 consists of solid material with only a recess 6 in the drawing plane. The recess is closed on its top and open on the bottom and on its side an inlet 7 is provided for the delivery of air.

Below the bottom 4 a rubber-plate 8 is fastened, which matches in shape and size and is also broken-up by passages 5 and recess 6. Its material is a special rubber, capable of allowing objects to glide.

Below the rubber plate 8 a rotor 9 is attached. The main body is a casting 10 and above as well as below are steel plates 11 which are also interchangeable wearing plates.

Rotor 9 has chambers 12 arranged in a circular row. The chambers have an equal cross-section and are of equal distance to each other just as the passages 5 in the bottom 4.

The lower closure of the arrangement consists also of a special rubber-plate 13 capable of allowing gliding and a steel bottom plate 14 which rests on the rubber-plate 13. The rubber-plate 13 and the bottom plate 14 have a recess 15 which matches the recess 6 in the bottom 4. The recesses 6 and 15 extend over the same width as the chambers 12 of the rotor 9 covering about two chambers 12.

At the loading station 1 a conveyor line 16 is attached to the bottom plate 14 below the recess 15 and ends at the loading station 2 as its inlet 7. At the same location of the bottom plate 14 of the loading station 2, a conveyor line 17 leading to a spray-nozzle is connected. It is also provided with an air inlet 18.

The rotor 9 is connected to a drive shaft 20 by means of four-cornered shaft 19. Additionally the drive shaft 20 drives a fan 23 by means of a four-cornered shaft 21 which has a disc 22 in the hopper 3 and slides along the bottom 4 at a small distance. The drives of loading stations 1 and 2 are synchronized.

For the application of spray-concrete on a concrete wall which is to be restored, a short concrete will be loaded in hopper 3 of loading station 1 and a finely grained gravel as an admixture will be filled in hopper 3 of the loading station 2. The material drops to the right half of the bottom 4 in the drawing and is uniformly moved by the fan 23 via the outlet 25 in the chambers 12 and it slides in these chambers over the rubber plate 13. When the chambers arrive on the other side between the recesses 6 and 15, the material will be steadily blown from the inlet 7 via two or three chambers 12 by the flowing conveyor stream into the conveyor lines 16 or 17. In the loading station 2 the concrete which was picked up in the loading station 1 mixes with the air in the admixture. The air inlet 18 allows for an adjustment of the air volume as required. It primarily allows for blowing out of the feeding line in case of a failure.

As was previously mentioned the water will be fed to the spray-nozzle first.

The loading station 1 could, for instance, be set up below a concrete silo, which will always fill up and it can be connected by a hose as a conveyor line 16 to loading station 2. Another variation would be to attach the loading stations 1 and 2 next to each other on a motor vehicle trailer and connect them with a rigid pipe as a conveyor line 16. In that case a common drive would be possible.

Figure 2:
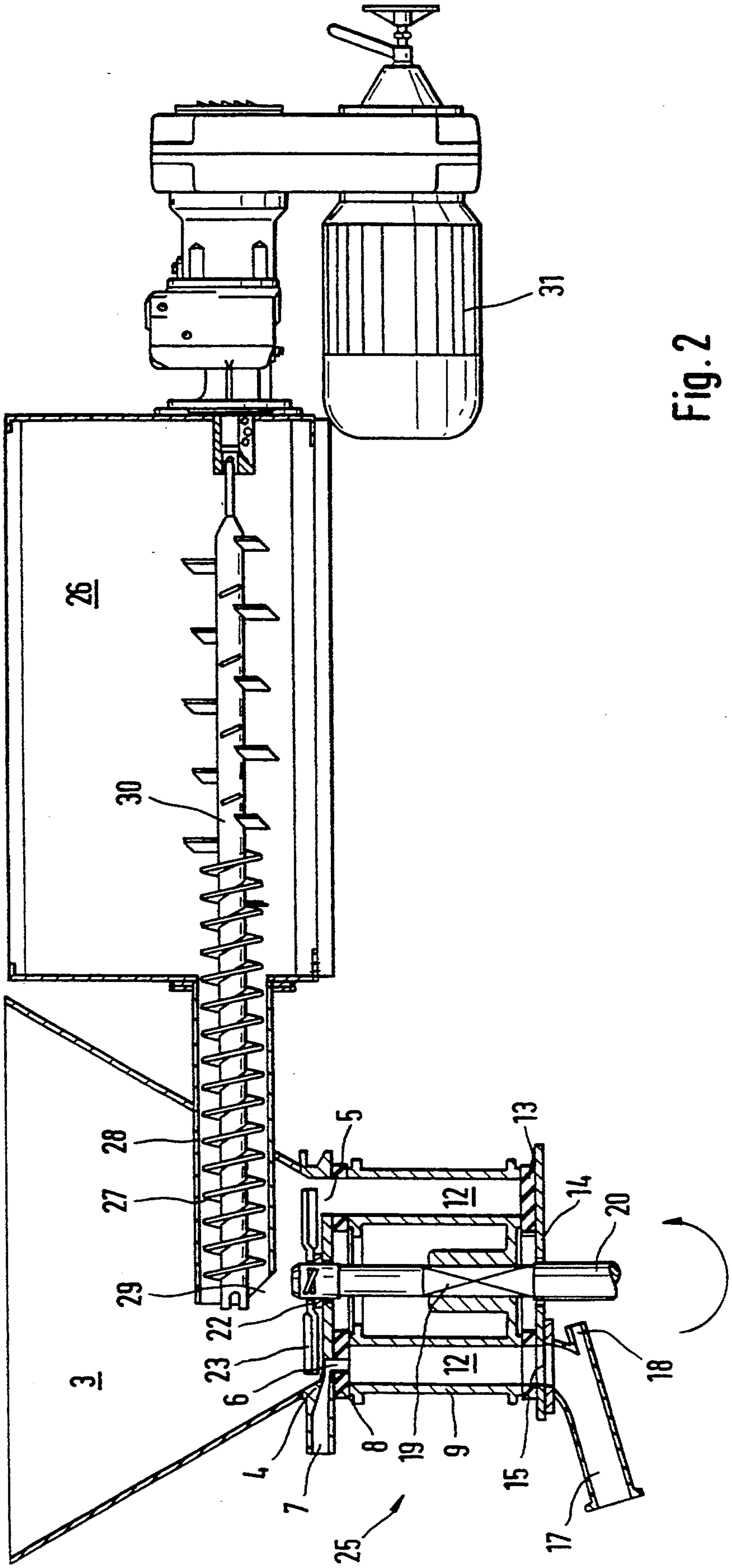
FIG. 2 shows a vertical, axial cross-section through a device for the joining of solid material components of a mortar or concrete and for the creation of a conveyor stream and simultaneous mixing.

In the design in FIG. 2 there is only one loading station 25 for a pneumatic conveyor device instead of the loading stations 1 and 2. As long as these correspond to the loading stations 1 and 2, the differences are the one piece construction of the rotor 9 and the reduced width of the recess 6. In this case from the trough-shaped storage container 26 for the binding agent a worm-conveyor 27 in a cover-pipe 28 is inserted from the side into the hopper 3. It is to be filled with the admixture. The worm-conveyor 26 and its cover-pipe 28 finish near the central axis of the hopper 3 within a small distance of, e.g. 5 to 10 cm, above the fan 23; the cover-pipe 28 includes an outlet 29, which is cut on an incline toward the bottom.

The worm-conveyor 27 continues to a worm- and bucket-shaft 30 and is located at the rounded bottom of the trough-shaped storage container 26. A joint drive for both can be e.g. a variable motor 31, which can be adjusted to between 50 and 300 RPM by a frequency-converter (not shown).

The admixture could, e.g., consist of sand of 0 to 8 mm grain, having a moisture content of about 3%. For the binding agent bagged cement is used. The continuously variable motor 31 permits the addition of the binding agent to be accurately proportioned. The binding agent, after leaving the cover-pipe 28, will be picked-up by the fan 23, pre-mixed with the sand, and loaded onto the pneumatic conveyor as was previously described and illustrated by FIG. 1. About 70 to 80% of the conveyor air is injected through the inlet 7, the remainder through the air inlet 18, which is on the conveyor line 17.

The mixing happens for the most part in the chamber 12. A mixing effect also occurs in the pneumatic conveyor hose which as a rule is at least 20 m long.

According to need, the rotor 9 could be made available with different height dimensions and/or number of chambers.

What is claimed is:

1. A method for the application of mortar or concrete by spraying, comprising the steps of:

dispensing a binding agent from a first loading station to a pneumatic stream;

dispensing an admixture from a second loading station to said pneumatic stream;

pneumatically transferring said binding agent and said admixture within said pneumatic stream to a spraying-nozzle by a pneumatic conveyor where water is added, wherein said binding agent is added to and mixed with said admixture during the pneumatic transfer.

2. The method of claim 1, wherein said binding agent is added to said pneumatic stream prior to adding the admixture to said pneumatic stream.

3. A device for the application of mortar or concrete by spraying, comprising:

a first loading station for dispensing a binding agent into a pneumatic stream;

a second loading station for dispensing an admixture into said pneumatic stream; and a pneumatic conveyor for pneumatically transferring said binding agent and said admixture within said pneumatic stream to a spray nozzle for adding water, wherein said binding agent is mixed with said admixture during the pneumatic transfer.

4. The device of claim 3, wherein said first loading station for said binding agent precedes said second loading station for said admixture.

5. The device of claim 3, wherein each of said first and second loading stations comprise an elongated hopper, and a rotor below said hopper which rotates in a rotational path on a vertical axis along the longitudinal axis of said hopper, wherein said rotor includes a plurality of vertical chambers which are, on a first portion of the rotational path of said rotor, open on the top and closed on the bottom, and on a second portion of the rotational path of said rotor, different from said first portion, open on both the top and the bottom, wherein said chambers are arranged between an inlet and an outlet of said pneumatic stream.

6. The device The apparatus of claim 5, wherein said rotors in said first and second loading stations have essentially equal horizontal cross-sections, and wherein said vertical chambers in said first loading station for said binding agent are not as high as said vertical chambers in said second loading station for said admixture.

7. A device for applying mortar or concrete to a surface spraying, comprising:

a pneumatic conveyor for creating a pneumatic stream;

a hopper for introducing an admixture into said pneumatic stream through an inlet of said pneumatic conveyor; and a mechanical conveyor for introducing a binding agent into said hopper adjacent an outlet of said pneumatic conveyor, wherein said admixture and said binding agent are combined in said hopper immediately before being transported in said pneumatic stream to a spray nozzle, wherein said binding agent and said admixture become pneumatically mixed within said pneumatic stream while being pneumatically transported to said spray nozzle; and a rotor below said hopper which rotates in a rotational path on a vertical axis, wherein said rotor includes a plurality of vertical chambers which are, on a first portion of said rotational path of said rotor, open on the top and closed on the bottom, and on a second portion of said rotational path of said rotor, open on both the top and the bottom, wherein said vertical chambers are arranged between said inlet and said outlet of said pneumatic conveyor.

8. The device of claim 7, wherein an impeller is provided below the outlet of said hopper, said impeller functioning directly above a bottom surface of said hopper for moving said binding agent and said admixture into said vertical chambers.

9. The device of claim 8, wherein said impeller is driven by a shaft coaxial to said rotor shaft.

10. The device of claim 8, wherein said impeller is driven by said rotor shaft.

11. The device of claim 7, wherein said mechanical conveyor is a worm-conveyor which is located in a cover-pipe and is laterally inserted through a wall of said hopper, wherein said worm-conveyor functions as a proportioning device with an adjustable drive and has a continuously variable motor.

12. The device of claim 11, wherein said worm-conveyor is connected to a storage container for dispensing said binding agent.

13. The device of claim 12, wherein said storage container is trough-shaped.

* * * * *